(12) United States Patent
Kunimatsu et al.

(10) Patent No.: US 6,707,448 B1
(45) Date of Patent: Mar. 16, 2004

(54) TOUCH CONTROL POSITION DETERMINING METHOD CONTROL PAD

(75) Inventors: Yoshimasa Kunimatsu, Aichi-ken (JP); Chikao Nagasaka, Aichi-ken (JP); Masato Nishikawa, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 375 days.

(21) Appl. No.: 09/587,338

(22) Filed: Jun. 5, 2000

(30) Foreign Application Priority Data

Jun. 7, 1999 (JP) ............................................ 11-159754

(51) Int. Cl.[7] ................................................. G09G 5/00
(52) U.S. Cl. ........................ 345/173; 345/156; 345/175; 250/216; 250/221
(58) Field of Search ................................ 345/172–175, 345/169; 178/18.09; 250/221; 340/365, 712

(56) References Cited

U.S. PATENT DOCUMENTS

| | | | | |
|---|---|---|---|---|
| 4,821,030 A | * | 4/1989 | Batson et al. | 345/173 |
| 4,868,912 A | * | 9/1989 | Doering | 345/175 |
| 4,899,138 A | * | 2/1990 | Araki et al. | 345/173 |
| 4,905,174 A | * | 2/1990 | Ouchi | 345/175 |
| 5,136,156 A | * | 8/1992 | Nounen et al. | 250/221 |
| 5,162,783 A | * | 11/1992 | Moreno | 341/31 |
| 5,196,836 A | * | 3/1993 | Williams | 345/174 |
| 5,355,149 A | * | 10/1994 | Casebolt | 345/175 |
| 6,351,260 B1 | * | 2/2002 | Graham et al. | 345/104 |
| 6,429,857 B1 | * | 8/2002 | Masters et al. | 345/175 |

* cited by examiner

Primary Examiner—Steven Saras
Assistant Examiner—Michael J. Moyer
(74) Attorney, Agent, or Firm—Nixon Peabody, LLP

(57) ABSTRACT

The present invention provides a touch control position determining method which allows the touch control position to be determined precisely regardless of the modes of control. When a touch control is made on an input pad, it is confirmed whether or not the upper and lower vertical position detecting lines are in the non-detected state in which infrared rays are not intercepted to determine whether the touch control position is located at the upper side, the center or the lower side (Steps 100 through 112). Next, it is confirmed whether or not the right and next horizontal position detecting lines are in the non-detected state to determine whether the touch control position along the horizontal direction is located at the left side, the center or the right side (Steps 114 through 122). Thus, the touch control position in the vertical and horizontal directions is determined and the determination result is outputted (Step 124).

20 Claims, 11 Drawing Sheets

TOUCH CONTROL POSITION DETERMINING METHOD CONTROL PAD

BACKGROUND OF THE INVENTION

1. Field of the Invention

The present invention relates to a method for determining a touch control position in a touch control input device into which control information is inputted by touching a control surface.

2. Description of the Related Art

Vehicles provided with a display unit fitted with a touch control function (hereinafter referred to as a touch tracer) have increased in numbers lately. Among display units fitted with a touch tracer, there is, for example, one which is provided with a display and a separate control pad for performing a touch control and which detects a touched position on the control pad, which position corresponds to a display screen on the display, by optical sensors.

Specifically, light emitting elements and light receiving elements are disposed so as to form a plurality of parallel optical axes, i.e., detecting lines, in the vertical direction and in the horizontal direction of the control pad. When an operator touches the surface of the control pad with a finger, the display unit judges a position of the center of mass of the finger on the control pad by beams, such as infrared rays which are emitted from the light emitting elements to the light receiving elements, being intercepted by the finger. The display unit outputs a coordinate position of the finger on the control pad on the basis of results of this judgment. The coordinate position of the finger is then, for example, transformed into a coordinate position on the display to be displayed thereon.

The display unit displays control items on the display when in displaying a control menu on the display; for example, three each in the vertical and horizontal directions. Thus, the operator can select a control item by controlling the touch tracer. The display unit is arranged so as to detect the touched position on the control pad of the touch tracer at this time and to select a control item on the display that corresponds to the touched position detected as described above.

In vehicles, a remote controller having the control pad is used in various modes; for example, fixed in a center console of the vehicle or held by hand. If the remote controller is fixed in the center console of the vehicle, the passenger traces or touch-controls the control pad of the touch tracer with a right or left thumb or by the forefinger. If the passenger holds the remote controller in a hand, the passenger generally traces or touch-controls the control pad with a finger of the other hand.

If the operator controls the touch tracer with the hand that is holding the remote controller, the operator mainly traces or touch-controls with the thumb.

However, when a position of the center of mass of a finger making a touch control is detected, the coordinate position detected may deviate from the intended position when the manner of holding the remote controller or the finger that is controlling the touch tracer is changed. In particular, a thumb performing touch control is inclined when the remote controller is held and controlled by one hand, so that a number of lines whose beams are intercepted by the thumb increases. Then, when the position of the center of mass of the thumb is judged from the lines whose beams are intercepted, a deviation arises between the intended position and the control position calculated from the position of the center of mass of the thumb.

To prevent erroneous operations and to allow control by blind touch when the touch tracer is used in a remote controller of a navigation system and the like, it is preferable to reduce area of the control pad, a tracing area, and to reduce coordinate resolution. However, when the resolution is reduced, the detected position of the center of mass of the finger may deviate largely from the intended position, depending on how touch control is performed.

Therefore, the burden on the operator in performing touch control becomes large, because the operator must perform control while being aware of deviation between an intended control position and a detected control position and must perform control while watching the display.

SUMMARY OF THE INVENTION

The present invention has been devised in view of the above-mentioned facts and provides a touch control position determining method which allows the touch control position to be determined precisely regardless of modes of control.

In a first aspect of the invention for achieving the above-mentioned object, there is provided a method for determining a touch control position on a control pad, including the steps of (a) detecting at least one of a plurality of horizontal position detecting lines, which are formed in parallel in a vertical direction of the control pad by beams irradiated in the vertical direction from light emitting sections to light receiving sections, and at least one of a plurality of vertical position detecting lines, which are formed in parallel in a horizontal direction of the control pad by beams irradiated in the horizontal direction from light emitting sections to light receiving sections; and (b) in a case in which interception of at least one of the plurality of horizontal position detecting lines or at least one of the plurality of vertical position detecting lines is detected in Step (a), determining a control position on the control pad on the basis of positions of at least one of the horizontal position detecting lines which is not intercepted and at least one of the vertical position detecting lines which is not intercepted.

According to the first aspect, the detecting lines are provided in the horizontal direction which is the direction of right and left from the point of view of the operator who makes a touch control on the control pad and in the vertical direction which is the direction of approaching/separating to/from the operator by the horizontal and vertical position detecting lines so that beams of the detecting lines are intercepted when the touch control is made. The touch control position on the control pad is judged from the position of the detecting lines whose beam is not intercepted.

The light beams are not intercepted at least in the detecting lines separated from the touch control position when the touch control is made on the control pad. Therefore, it becomes possible to determine the touch control position intended by the operator from the detecting lines whose beams are not intercepted.

A second aspect of the invention is the method of the first aspect of the invention, wherein, in a case in which the control pad is divided into three areas in the horizontal direction: the step (a) detects interception of at least one of horizontal position detection lines which are respectively formed in the vertical direction at both horizontal direction end portions of the control pad; and the step (b) determines control to be at one of said three areas, on the basis of a position of at least one of said horizontal position detection lines which is not intercepted.

According to the second aspect, the horizontal position detecting lines are provided so that the light beams are intercepted when the touch control is made at the both ends in the horizontal direction to judge one of the three areas where the touch control position is located from the horizontal position detecting lines.

It is then possible to determine that the area where the touch control is made is the center when the detecting lines at the both ends are not detected.

It is also possible to determine that the area where the touch control is made is the other end when either one end of the detecting lines at the both ends is not detected.

Thus, the vertical position detecting lines and horizontal position detecting lines allow the judgment to be made along the intention of the operator who makes the touch control by judging the touch control position from the position of the non-detected detecting lines whose beams are not intercepted. The touch control position may be judged more precisely regardless of the state of control as compared to the case of finding the position of the center of mass of the finger from the detecting lines whose beams are intercepted and of determining this center of mass position as the touch control position.

Further, it allows the touch control position to be determined with low resolution because it is not what determines the center position when the touch control is made and the detecting lines need not be provided at tight intervals. In addition to that, it allows a number of parts for forming the detecting lines to be reduced and power consumed to detect the touch control to be suppressed.

A third aspect of the invention is the second aspect of the invention, wherein, in a case in which all of the horizontal position detecting lines respectively formed at the both end portions are not intercepted, step(b) determines that the control position is a center area.

According to the third aspect, it is judged whether or not a touch control has been made by the horizontal position detecting lines and when it is judged that the touch control has been made, the touch control position in the vertical direction is determined by the vertical position detecting lines. At this time, the horizontal position detecting lines may be disposed at intervals which allow to detect the touch control.

It also allows the power consumption to be suppressed as compared to the case of detecting whether or not a touch control has been made by the vertical and horizontal position detecting lines.

According to a fourth aspect of the invention, the vertical position detecting lines are detected in order from the vertical position detecting line positioned at either one of the outermost ends to the other outermost end in detecting whether or not the vertical position detecting lines are intercepted.

The fourth aspect is the second aspect of the invention, wherein in a case in which, of the horizontal position detection lines respectively formed at the both end portions, only one horizontal position detection line at one end portion is not intercepted, step (b) determines that the control position is an area portion at another end portion.

An operator places the finger tip at intending position in making a touch control in general. Therefore, the finger tip comes to the side distant from the operator, not the side closer to the operator, among the vertical position detecting lines. Accordingly, the finger tip is positioned in the vicinity of the detecting line distant from the operator among the vertical position detecting lines whose beams are intercepted and it becomes possible to determine the position precisely by determining the touch control position from this vertical position detecting line.

In a fifth aspect, there is provided a control pad, including: a plurality of horizontal position detecting lines formed in parallel in a vertical direction of the control pad by beams irradiated in the vertical direction from light emitting sections to light receiving sections; a plurality of vertical position detecting lines formed in parallel in a horizontal direction of the control pad by beams irradiated in the horizontal direction from light emitting sections to light receiving sections; a detector for detecting interception of at least one of the plurality of horizontal position detecting lines and at least one of the plurality of vertical position detecting lines; and a judging device for determining a control position on the control pad on the basis of positions of at least one of the horizontal position detecting lines which are not intercepted and at least one of the vertical position detecting lines which are not intercepted.

It is noted that the control pad has the same effects with the touch control position determining method of the first through fourth aspects described above, so that the aspects thereof will be omitted here.

DESCRIPTION OF THE PREFERRED EMBODIMENTS

First Embodiment

Figure 1:
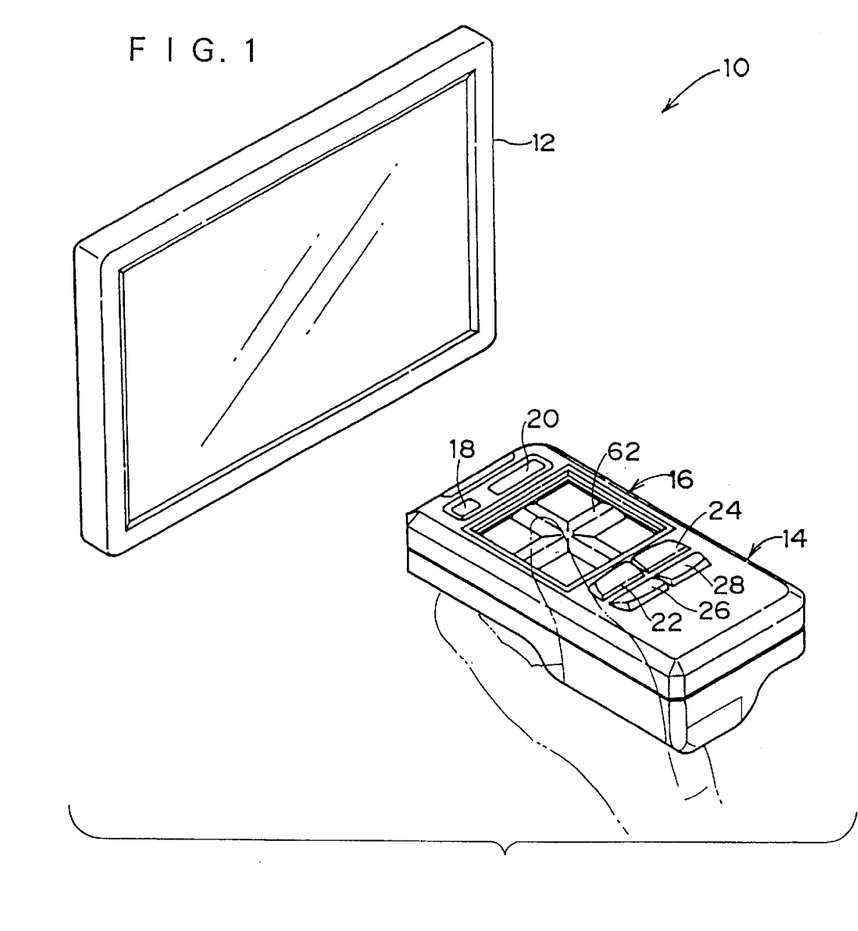
FIG. 1 is a schematic perspective view showing a display and a remote controller of a display system applied in an embodiment wherein the remote controller is controlled by the left hand.
Figure 2:
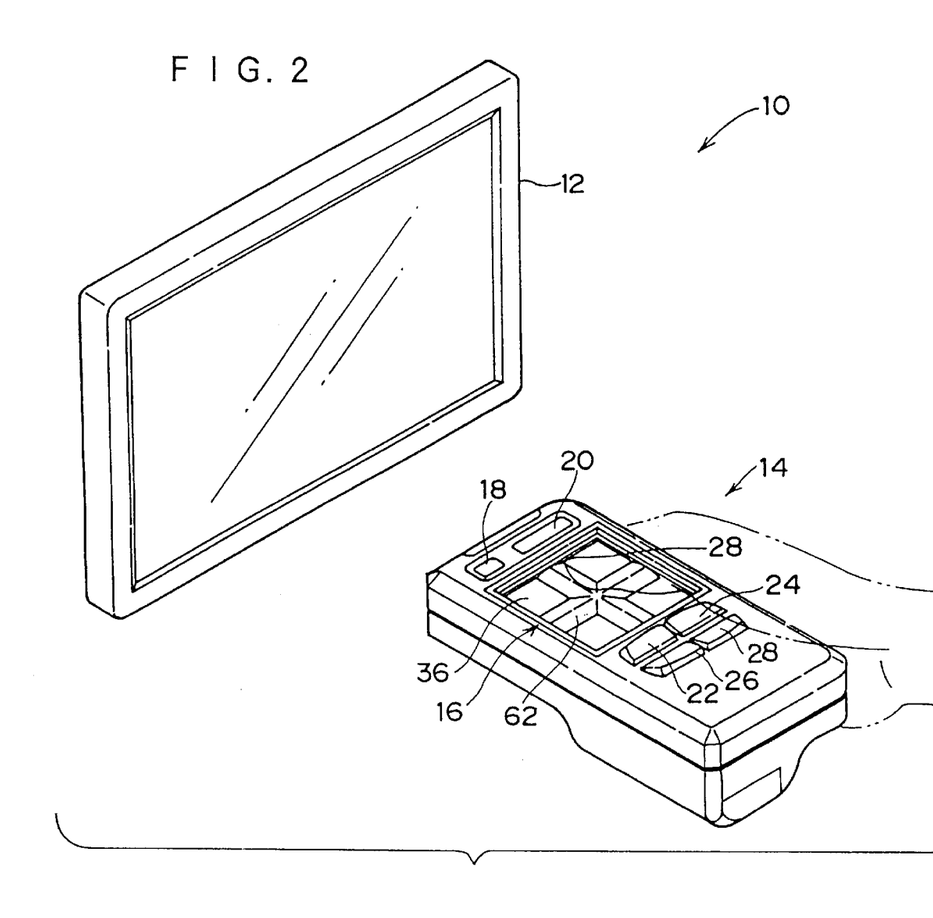
FIG. 2 is a schematic perspective view showing the display and the remote controller of the display system applied in the embodiment wherein the remote controller is controlled by the right hand.

Preferred embodiments of the present invention will be explained below with reference to the drawings. FIGS. 1 and 2 show a display system 10 of the present embodiment. The display system 10 is provided with a display 12 and a remote controller 14 to display the state of control corresponding to attached facilities provided in a vehicle such as an air-conditioner, an audio equipment and a car navigation system and a map screen of the car navigation system and to allow an operator to make a control based on the display.

The display 12 is mounted where it is visible for the passenger such as the center of an instrument panel of the vehicle. The remote controller 14 may be disposed removably at position where the driver can readily make a control such as a center console of the vehicle. The passenger may be able to manipulate the remote controller 14 by holding it by one hand. The passenger can manipulate the remote controller 14 by holding it by the left hand as shown in FIG. 1 or by the right hand as shown in FIG. 2 in controlling the remote controller 14 by one hand. The passenger can make various controls to the screen displayed on the display 12 by the remote controller 14 in the display system 10.

As shown in FIGS. 1 and 2, the remote controller 14 is provided with a touch control input device (hereinafter referred to as a touch tracer 16) at the center together with control switches such as a power switch 18, a menu switch 20, an air-conditioner switch 22, a navigation current position switch 24, a detail (narrow area) switch 26 and a wide area switch 28 for switching display scale in displaying the map screen. A screen corresponding to a selected processing content is displayed on the display 12 when the operator presses such control switches to select the process in the display system 10. It is noted that the remote controller 14 may be provided with arbitrary switches such as a control switch for changing over the navigation screen and a TV screen from each other for example.

Figure 3:
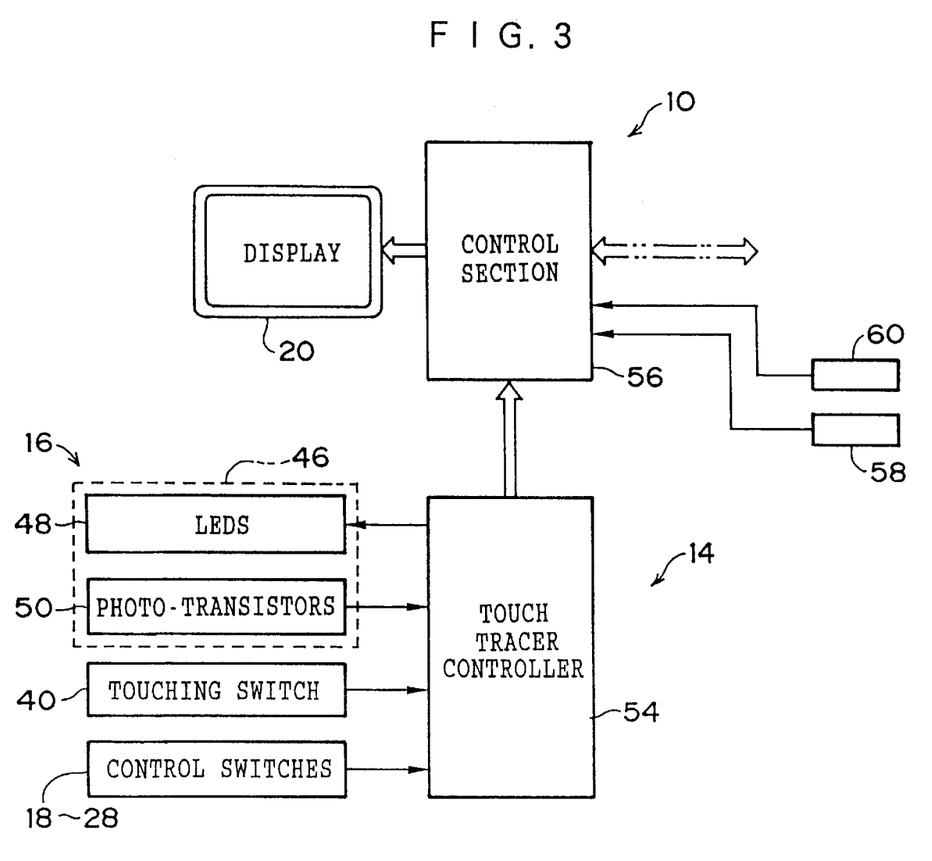
FIG. 3 is a block diagram showing the schematic structure of the display system.
Figure 4:
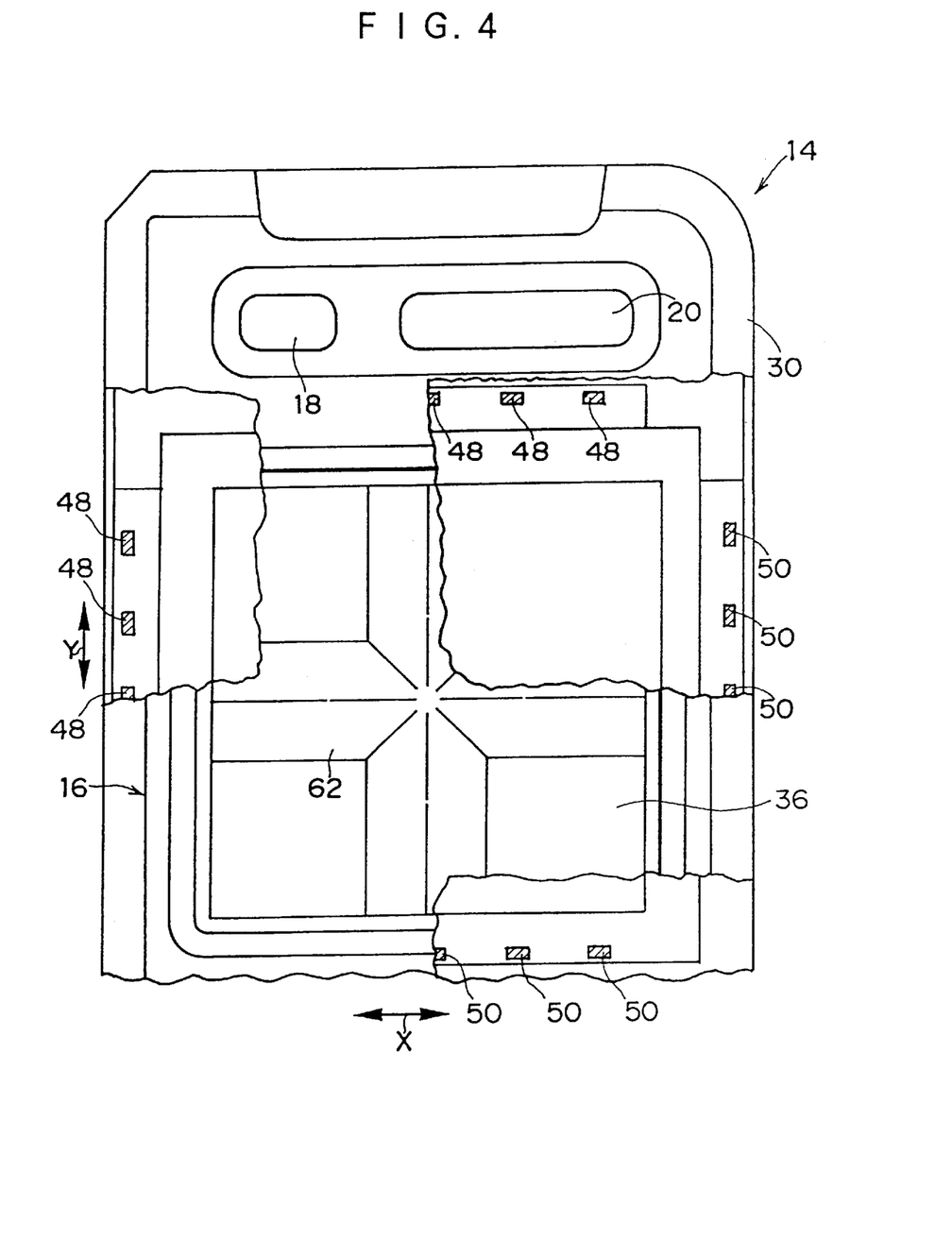
FIG. 4 is a schematic plan view showing the main part of a touch tracer.
Figure 5:
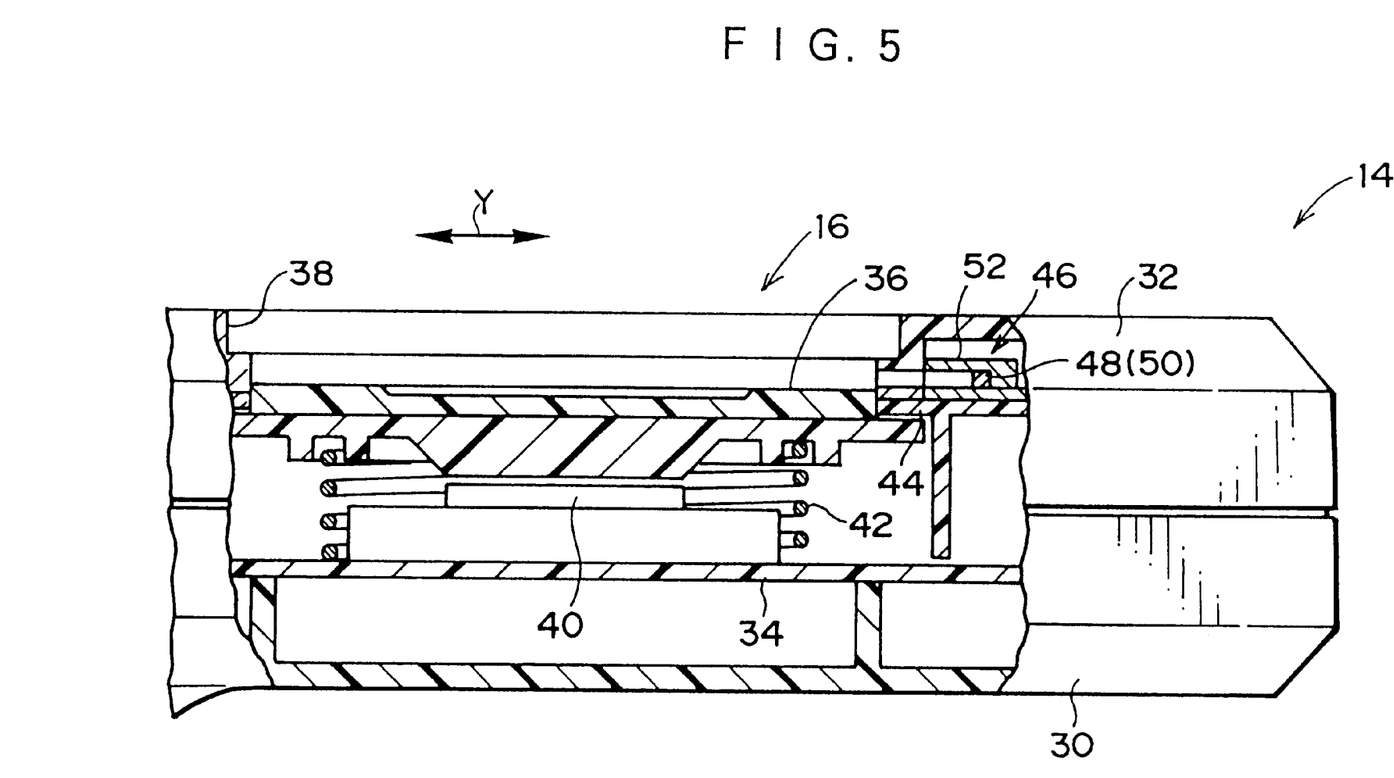
FIG. 5 is a schematic plan view showing the main part of the touch tracer.

FIG. 3 shows the schematic structure of the display system 10 and FIGS. 4 and 5 show the schematic structure of the touch tracer 16 provided in the remote controller 14.

As shown in FIG. 5, an outer frame of the remote controller 14 is formed by outer casings 30 and 32. A substrate 34 of the touch tracer 16 is mounted to the outer casing 30, i.e., the bottom side. An input pad 36 for making a touch control is disposed above the substrate 34. A rectangular opening 38 is created through the upper outer casing 32 and the input pad 36 is disposed at the inside of the opening 38.

Meanwhile, a touching switch 40 and a compression coil spring 42 are mounted on the plane, i.e., the upperplane, facing to the input pad 36 of the substrate 34. The compression coil spring 42 abuts to the back of the input pad 36 to urge and hold the peripheral part of the input pad 36 to an inner casing 44 disposed within the outer casings 30 and 32. When the input pad 36 is pressed against the urging force of the compression coil spring 42, the under plane of the input pad 36 abuts to the touching switch 40.

As shown in FIG. 5, a photosensor unit 46 is provided within the outer casing 32. The photosensor unit 46 is disposed such that LEDs 48, i.e., light emitting sections, are paired off with phototransistors 50, i.e., light receiving sections, as shown in FIG. 4.

LEDs 48 and photo-transistors 50 are disposed by being surrounded by a light shielding member 52 to suppress light irradiated from the LED 48 from diffusing. Thereby, the light, e.g., infrared rays, irradiated from the LED 48 passes through the vicinity of the surface of the input pad 36 and is inputted only to the photo-transistor 50 disposed so as to face to the LED 48.

Figure 6A:
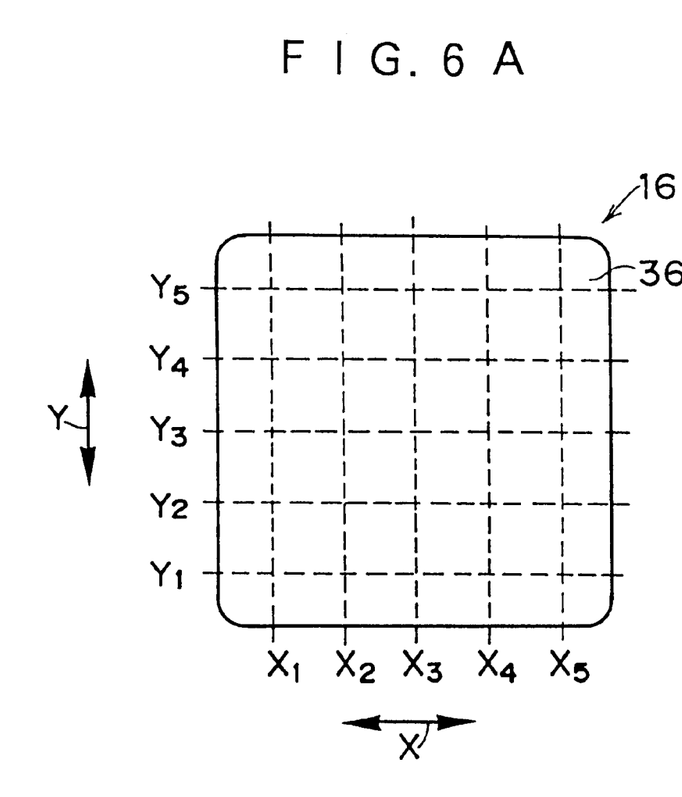
FIG. 6A is a diagrammatic view showing the disposition of vertical position detecting lines and horizontal position detecting lines formed along the surface of an input pad according to a first embodiment

The touch tracer 16 is provided with a plurality of pairs of LEDs 48 and photo-transistors 50 at predetermined intervals in the vertical (in the direction of arrow Y) and horizontal (in the direction of arrow X) directions of the input pad 36. The respective LEDs 48 and photo-transistors 50 form a plurality of detecting lines at predetermined intervals along the vertical and horizontal directions (see FIG. 6).

As shown in FIG. 3, the remote controller 14 is provided with a touch tracer controller 54 and the LEDs 48 and the photo-transistors 50, i.e., a photo-sensor unit 46, are connected to the touch tracer controller 54. The touch tracer controller 54 is also connected with the touching switch 40 together with the control switches 18 through 28 such as the power switch 18.

When the light emitted from the LEDs 48 is intercepted by a finger, the touch tracer controller 54 judges that a touch control has been made and determines controlled position on the input pad 36. The result of discrimination of the controlled position is outputted to a control section 56 of the display system 10. The control section 56 of the display system 10 transforms the control positioned outputted from the touch tracer controller 54 on the coordinates on the display 20 and clearly shows an item to be controlled on the display 12 corresponding to the coordinate position by inverting it for example. When the operator turns on the touching switch 40 by pressing the input pad 36 by the finger touching the input pad 36 in this state, the operator can select an appropriate control item and can execute a process based on the control item.

A cursor may be displayed on the display 12 by making the touch control and the cursor displayed on the display 12 may be moved by tracing the input pad 36 by moving the touched finger on the input pad 36 in the direction to be traced. It is noted that a finger guide 62 is formed on the input pad 36 of the touch tracer 16 by cross-shaped grooves or projections along the vertical and horizontal directions as shown in FIGS. 1, 2 and 4. It allows the operator to trace or to make a touch control accurately at arbitrary position on the input pad 36 by blind touch.

As shown in FIG. 3, image signals are inputted to a control section 56 of the display system 10 from attachment systems such as a navigation system, an audio system and a TV tuner not shown so as to display a screen corresponding to such image signal on the display 20. A control menu is also displayed on the display 20 so that a control signal corresponding to a selected item is outputted when the operator selects the control item on the control menu. The attachment system carries out a process corresponding to the selected control item.

It is noted that a car speed sensor 58, a parking brake switch 60 and others are connected to the control section 56 so that the control section 56 judges the vehicle running state whether the vehicle is running or not based on signals from the car speed sensor 58 and the parking brake switch 60 and to carry out processes corresponding to the vehicle running state or stopping state.

As shown in FIG. 6A, the touch tracer 16 of the first embodiment is provided with five horizontal position detecting lines $X_1$, $X_2$, $X_3$, $X_4$ and $X_5$ (hereinafter referred to as horizontal position detecting lines X in general) along the vertical direction and five vertical position detecting lines Y1, Y2, Y3, Y4 and Y5 (hereinafter referred to as vertical position detecting lines Y in general). The vertical position detecting lines Y and horizontal position detecting lines X are provided to detect which line of beam is intercepted regardless of the size of the finger to be touched. Accordingly, the vertical position detecting lines Y and horizontal position detecting lines X are formed at the minimum required intervals, e.g., within 10 mm.

It is noted that when the operator holds the remote controller 14 by one hand, the input pad 36 of the touch tracer 16 comes on the side of the display 12 with respect to the switches 22 through 28 as shown in FIGS. 1 and 2. At this time, the vertical position detecting line $Y_1$ comes to the front side (the direction in the opposite side from the display 12 in FIGS. 1 and 2). Accordingly, the side of the vertical position detecting line $Y_1$ in FIG. 6A is the lower side and the side of the vertical position detecting line $Y_5$ is the upper side in the vertical direction. In the horizontal direction, the side of the horizontal position detecting line $X_1$ is the left side and the side of the horizontal position detecting line $X_5$ is the right side.

Figure 6B:
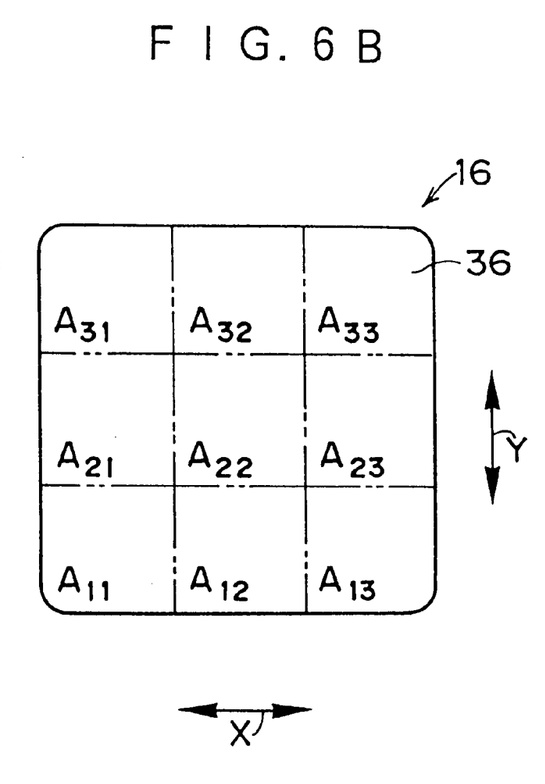
FIG. 6B is a diagrammatic view showing an area for determining the touch control position in the first embodiment.

The touch tracer controller 54 judges which area of areas A11 through A33 obtained by dividing the input pad 36 into three parts respectively in the vertical and horizontal directions is touched and outputs the result of judgment to the control section 56. Thereby, the display system 10 displays the touch control position by inverting the control item of the appropriate area displayed on the display 12 for example.

Meanwhile, the touch tracer controller 54 determines the touch-controlled area from the detecting lines whose infrared ray is not intercepted among the vertical position detecting lines Y and horizontal position detecting lines X. That is, when any one of infrared ray of the vertical position detecting lines Y and horizontal position detecting lines X is intercepted, the touch tracer controller 54 determines the touch control position from the vertical position detecting lines Y and horizontal position detecting lines X whose infrared ray is not intercepted.

The process for determining the touch control position by the touch tracer controller 54 will be explained below with reference to a flow chart shown in FIG. 7 as the operation of the first embodiment.

This flow chart is executed when the display system 10 is turned on and a predetermined image, e.g., the control menu, is displayed on the display 12. In the first Step 100, the touch tracer controller 54 reads the output of each photo-transistor 50 provided in the photosensor unit 46. It is noted that the touch tracer 16 is capable of detecting the touch control by always turning on the LEDs 48 and by emitting infrared rays.

In Step 102, the touch tracer controller 54 judges whether no infrared ray from the LED 48 has reached to any one of the photo-transistors 50 provided in the photosensor unit 46. When no touch control is carried out, no infrared ray is intercepted and the touch tracer controller 54 determines to be NO in Step 102.

Meanwhile, when a touch control is made, the infrared ray does not reach to any one of the photo-transistors 50 from the LED 48. In this case, the touch tracer controller 54 judges to be YES in Step 102 and moves to Step 104. The touch tracer controller 54 determines an area where the touch control has been made in Step 104.

The touch tracer controller 54 determines the area where the touch control is made by judging whether or not the infrared ray of the vertical position detecting line $Y_5$ or of the vertical position detecting lines $Y_4$ and $Y_5$ in the vertical direction is intercepted in Step 104. Further, it judges whether or not the infrared ray of the vertical position detecting line $Y_1$ or of the vertical position detecting lines $Y_1$ and $Y_2$ of the lower side is intercepted in Step 106. That is, the touch tracer controller 54 checks the vertical position detecting lines Y whose infrared rays are not intercepted among the vertical position detecting lines $Y_1$ through $Y_5$.

Here, when no infrared ray of the upper vertical position detecting line $Y_5$ or of the vertical position detecting lines $Y_4$ and $Y_5$ are intercepted and no infrared ray of the lower vertical position detecting line $Y_1$ and of the vertical position detecting lines $Y_1$ and $Y_2$ are also intercepted (YES in Steps 104 and 106), the touch tracer controller 54 moves the process to Step 108 to judge that the touch control position in the vertical direction is the center.

When no infrared ray of the vertical position detecting line $Y_5$ or of the vertical position detecting lines $Y_4$ and $Y_5$ is intercepted and the infrared rays of the vertical position detecting lines $Y_1$ and $Y_2$ are intercepted (YES in Step 104 and NO in Step 106), the process is shifted to Step 110 to determine that the touch control position in the vertical direction is the lower side. When the infrared ray of the upper vertical position detecting line $Y_1$ or of the vertical position detecting lines $Y_1$ and $Y_2$ is intercepted (NO in Step 104), the process is shifted to Step 112 to determine that the touch control position in the vertical direction is the upper side. It is noted that the vertical position detecting line $Y_1$ or the vertical position detecting lines $Y_1$ and $Y_2$ may be judged at first and the vertical position detecting line $Y_5$ or the vertical position detecting lines $Y_4$ and $Y_5$ may be judged next.

That is, the touch tracer controller 54 determines the touch control position to be any one of the upper, center and lower areas by judging that the touch control position is the center of the lower area when the infrared ray is not intercepted in the upper detecting line $Y_5$ and by judging that the touch control position is the center or the upper area when the infrared ray of the lower vertical position detecting line $Y_1$ is not intercepted in Steps 104 through 112.

When the touch tracer controller 54 determines the touch position in the vertical direction as described above, it confirms whether or not the infrared ray of the horizontal position detecting line $X_5$ or the horizontal position detecting lines $X_4$ and $X_5$ on the right side of the horizontal direction is intercepted in Step 114. It also confirms whether or not the infrared ray of the horizontal position detecting line $X_1$ or of the horizontal position detecting lines $X_1$ and $X_2$ on the left side is intercepted in Step 116. That is, it checks the horizontal position detecting line X whose infrared ray is not intercepted among the horizontal position detecting lines $X_1$ through $X_5$ which are formed at predetermined intervals in the horizontal direction.

When the infrared ray of the right side horizontal position detecting line $X_5$ or of the horizontal position detecting lines $X_4$ and $X_5$ is not intercepted and the infrared ray of the left side horizontal position detecting line $X_1$ or of the horizontal position detecting lines $X_1$ and $X_2$ is not intercepted (YES in Steps 114 and 116), the process is shifted to Step 118 to judge that the touch control position in the horizontal direction is the center.

When no infrared ray of the horizontal position detecting line $X_5$ or of the horizontal position detecting lines $X_4$ and $X_5$ is intercepted and the infrared rays of the horizontal position detecting lines $X_1$ or of the horizontal position detecting lines $X_1$ and $X_2$ are intercepted (YES in Step 114 and NO in Step 116), the process is shifted to Step 120 to determine that the touch control position in the horizontal direction is the left side. When the infrared ray of the horizontal position detecting line $X_5$ or of the horizontal position detecting lines $X_4$ and $X_5$ is intercepted (NO in Step 114), the process is shifted to Step 122 to determine that the touch control position is the right side. It is noted that the horizontal position detecting line $X_1$ or the horizontal position detecting lines $X_1$ and $X_2$ may be judged at first and the horizontal position detecting line $X_5$ or the horizontal position detecting lines $X_4$ and $X_5$ may be judged next.

That is, the touch tracer controller 54 judges that the touch control is made at the center or the left side in the horizontal direction when the infrared ray of at least the right horizontal position detecting line $X_5$ is not intercepted and that the touch control is made at the center or the right side when the infrared ray of the horizontal position detecting line $X_1$ is not intercepted. Thereby, the touch tracer controller 54 judges that the touch control position is either the right side, the center or the left side in the horizontal direction in Steps 144 through 122. Thus, the touch tracer controller 54 can judge that the touch control position is any one of the right side, the center or the left side.

When the touch tracer controller 54 determines the touch control position in the vertical and horizontal directions as described above, it outputs the result of judgment in Step 124. Thereby, the control section 56 makes a display corresponding to the determined area on the display 12.

Figure 7:
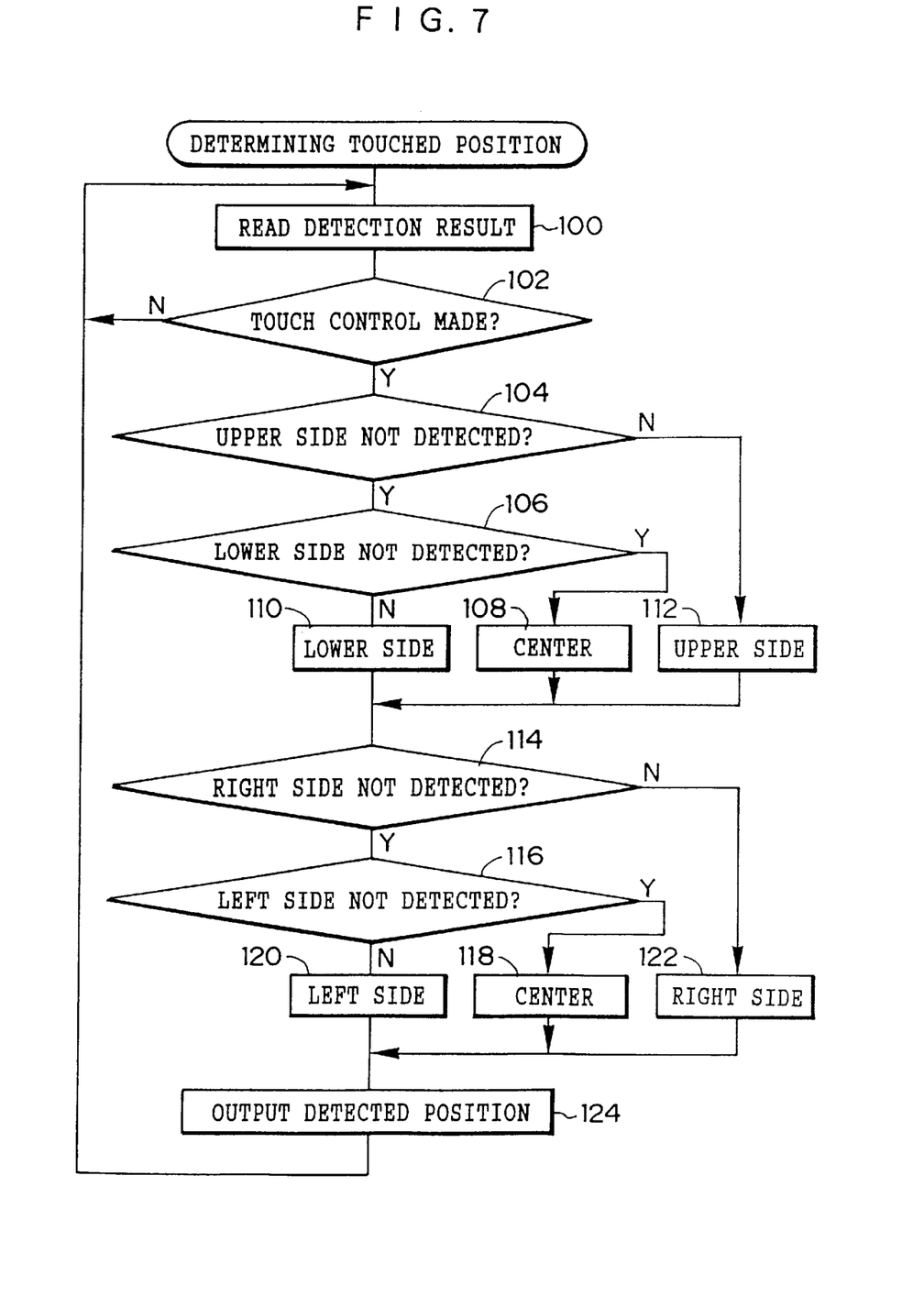
FIG. 7 is a flow chart schematically showing the process for determining the touch control position in the first embodiment.
Figure 8A:
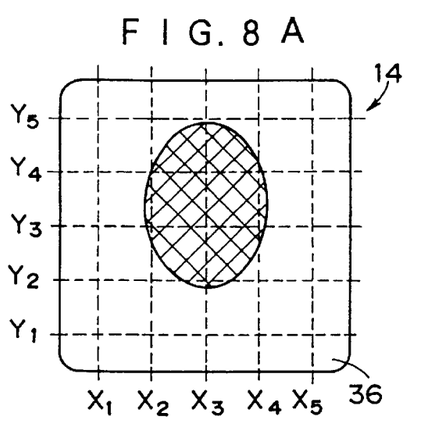
FIGS. 8A through 8D are diagrammatic views illustrating the position of a finger on an input pad with respect to vertical position detecting lines and horizontal position detecting lines in making a touch control.
Figure 8B:
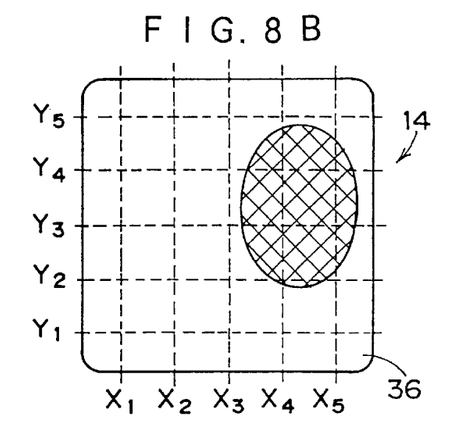

For instance, when the touch control is made without inclining the finger by fixing the remote controller 14 at predetermined position or by holding the remote controller 14 by one hand and by making the touch control by the other hand, almost the same results may be obtained in detecting the gravitational position of the finger which is the touch control position from the detecting lines whose infrared ray is intercepted and in judging the touch control position from the detecting lines whose infrared ray is not intercepted as shown in FIGS. 8A and 8B. That is, the result of judgment based on the flow chart in FIG. 7 is an area A32 in FIG. 8A and an area A23 in FIG. 8B. It is noted that the position of the finger when the touch control is made is shown by hatching in FIGS. 8A through 8D.

By the way, a single hand control of holding the remote controller 14 by one hand and of making a touch control by a finger, e.g., the thumb, of the hand holding the remote controller 14 is made, the finger inclines with respect to the input pad 36. For instance, when the operator holds the remote controller 14 by the left hand as shown in FIG. 1, the finger tip points the upper right direction. When the operator holds the remote controller 14 by the right hand as shown in FIG. 2, the finger tip points the lower left direction.

Figure 8C:
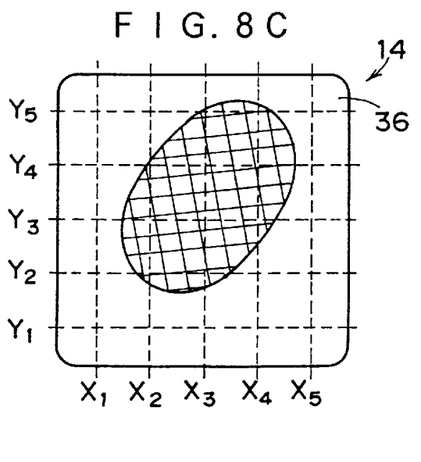
Figure 8D:
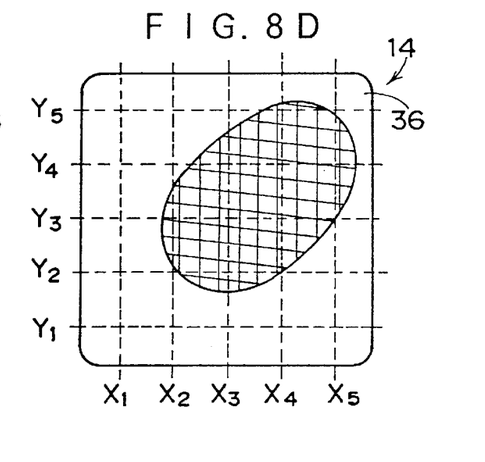

Due to that, a number of detecting lines whose infrared ray is intercepted increases when the touch control is made as shown in FIGS. 8C and 8D. Accordingly, when the touch control position is judged from the gravitational position of the finger, the touch control position is judged to be in the center area A22 in the vertical and horizontal directions even if the position of the finger deviates.

When the touch control position is judged based on the detecting line whose infrared ray is not intercepted along the flow chart shown in FIG. 7 on the other hand, the infrared ray of the vertical position detecting line $Y_1$ is not intercepted in case of FIG. 8C and the infrared ray of the vertical position detecting line $Y_5$ is intercepted, so that the touch control position in the vertical direction is judged to be the upper side. Further, the touch control position in the horizontal direction is judged to be center because the infrared rays of the both horizontal position detecting lines $X_1$ and $X_5$ are not intercepted. That is, the area A32 is judged to be the touch control position in FIG. 8C.

In case of FIG. 8D, no infrared ray of the vertical position detecting line $Y_1$ and of the horizontal position detecting line $X_1$ is intercepted and the infrared rays of the vertical position detecting line $Y_5$ and of the horizontal position detecting line $X_5$ are intercepted. Therefore, the touch control position is judged to be an area A33.

Meanwhile, it is a general practice to touch the input pad 36 so that the finger tip comes to the desired position rather than the bulb of a finger in making a touch control on the input pad 36. Therefore, in case of FIG. 8C, the touch control position should be judged to be the upper side in the vertical direction rather than the center, i.e., the area A32. In case of FIG. 8D, the touch control position should be judged to be the upper side in the vertical direction rather than the center and the right side in the horizontal direction, i.e., the area A33.

Accordingly, although the passenger who has made a touch control feels a sense of incompatibility when the gravitational position of the finger is judged from the detecting lines which are intercepted by the finger and when a display is made on the display 12 corresponding to the result of judgment, it becomes possible to judge along the sense of the passenger and the passenger will feel no sense of incompatibility even if the result of judgment is displayed on the display 12 by judging the control position based on the detecting lines whose infrared rays are not intercepted.

Therefore, no burden is placed on the passenger to match the move of the finger with the display of the display 12 when the passenger makes a touch control.

Figure 9A:
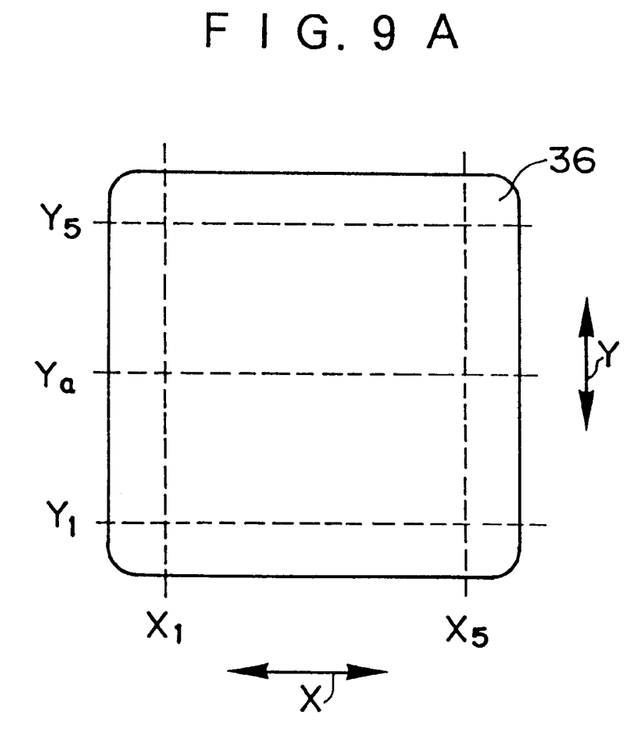
FIGS. 9A and 9B are diagrammatic views showing another exemplary disposition of the vertical position detecting lines and horizontal position detecting lines in the first embodiment.
Figure 9B:
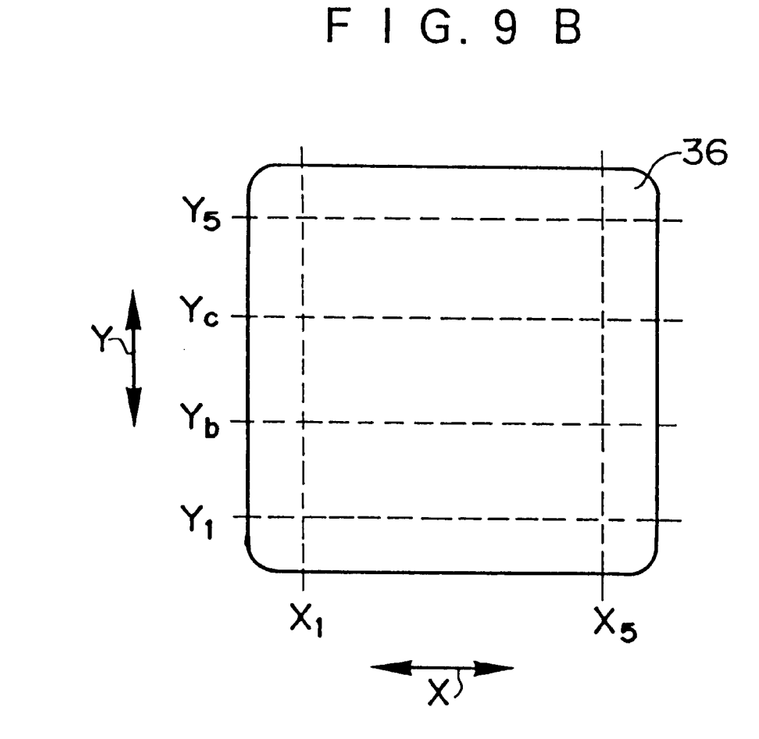

It is noted that the detecting lines are disposed at equal intervals along the vertical and horizontal directions in the present embodiment, the detecting lines will do if they at least allow to detect that a touch control has been made and to judge whether or not a controlling finger exists at the both ends in the vertical direction and at the both ends in the horizontal direction. Therefore, the detecting lines may be what a vertical position detecting line Ya (see FIG. 9A) or vertical position detecting lines Yb and Yc (see FIG. 9B) are provided between the vertical position detecting lines $Y_1$ and $Y_5$ in addition to the vertical position detecting lines $Y_1$ and $Y_5$ and the horizontal position detecting lines $X_1$ and $X_5$ on the both ends in the vertical and horizontal directions for example as shown in FIGS. 9A and 9B. Further, it is possible to provide a plurality of horizontal position detecting lines between the horizontal position detecting lines $X_1$ and $X_5$ instead of the vertical position detecting lines Ya, Yb and Yc to detect a touch control by the horizontal position detecting lines X.

Second Embodiment

A second embodiment of the invention will be explained below. It is noted that the basic structure of the second embodiment is the same with that of the first embodiment described above and the same parts with those in the first embodiment will be denoted by the reference numerals and an explanation thereof will be omitted here.

Figure 10:
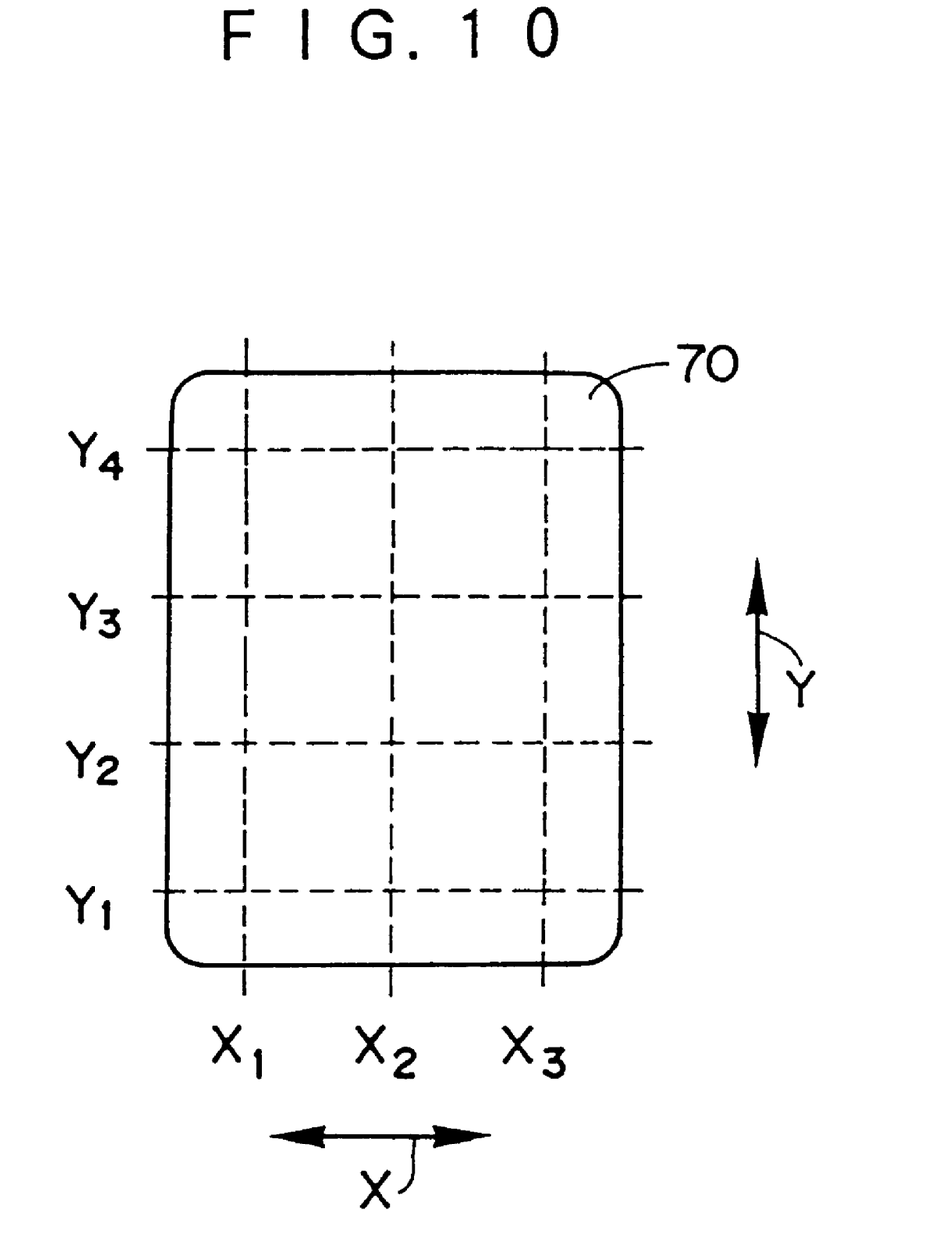
FIG. 10 is a diagrammatic view showing the disposition of vertical position detecting lines and horizontal position detecting lines according to a second embodiment.

FIG. 10 shows an outline of detecting lines on an input pad 70 applied in the second embodiment. According to the second embodiment, the horizontal position detecting lines $X_1$ and $X_3$ are provided at the both ends in the horizontal direction and the horizontal position detecting line $X_2$ is provided between the horizontal position detecting lines $X_1$ and $X_3$. The vertical position detecting lines $Y_1$, $Y_2$, $Y_3$ and $Y_4$ are provided along the vertical direction at predetermined intervals. It is arranged so as to be able to detect coordinate position reliably by the vertical position detecting lines Y and horizontal position detecting lines X when the input pad 70 is touched by a finger.

Meanwhile, the pad is arranged so as to judge whether or not a touch control has been made by detecting whether the infrared rays of the horizontal position detecting lines $X_1$, $X_2$ and $X_3$ are intercepted and to determine the control position in the horizontal direction from the horizontal position detecting lines $X_1$ and $X_2$ at first when the touch control is made in the second embodiment. After that, it is confirmed whether or not the infrared ray is intercepted in order from the upper vertical position detecting line $Y_4$ to determine the touch control position in the vertical direction.

Figure 11:
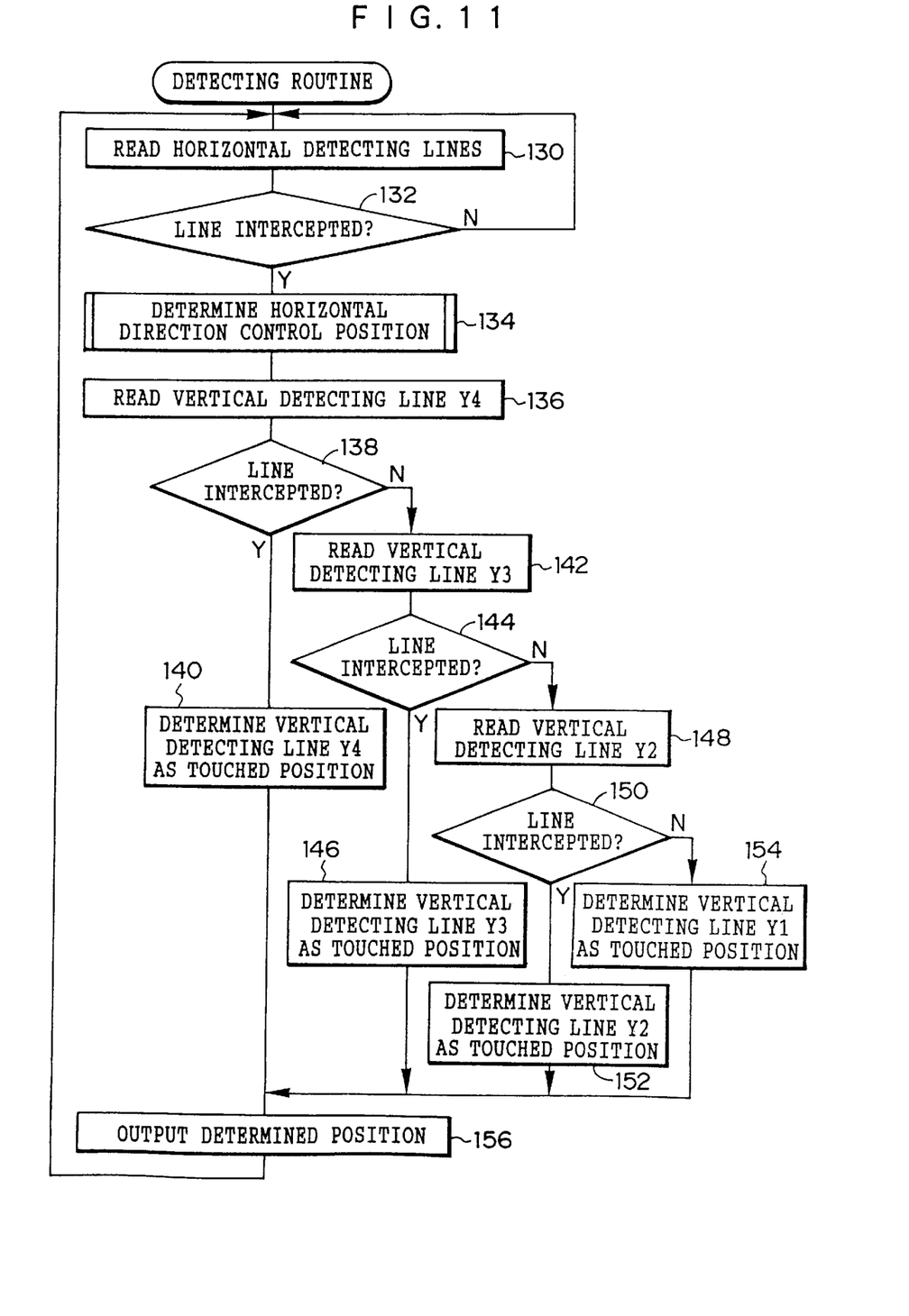
FIG. 11 is a flow chart schematically showing the process for judging touch control position in the second embodiment.

The process for determining the touch control position in the second embodiment will be explained below with reference to a flow chart shown in FIG. 11.

In the flow chart, the touch tracer controller 54 reads outputs of the horizontal position detecting lines $X_1$ through $X_3$ in the first Step 130 and confirms whether or not any infrared ray of the horizontal position detecting lines $X_1$ through $X_3$ is intercepted in the next Step 132.

When a touch control is made on the input pad 70 here, the infrared rays of the horizontal position detecting lines $X_1$ through $X_3$ are intercepted and the touch tracer controller 54 determines to be YES in Step 132. Thereby, the touch tracer controller 54 detects that the touch control has been made.

When the touch tracer controller 54 detects that the touch control has been made, it determines the touch control position in the horizontal direction in the next Step 134. The processes in Steps 114 through 122 in the flow chart in FIG. 7 described above may be used to determined the touch control position in the horizontal direction. Thereby, the touch control position is determined to be in any one of the left, center and right area.

After determining the touch control position in the horizontal direction, the touch tracer controller 54 reads an output of the top vertical position detecting line $Y_4$ in the next Step 136 and confirms whether or not the infrared ray is intercepted in the vertical position detecting line $Y_4$ by the finger making the touch control in the next step 138. Thereby, when the infrared ray is intercepted in the vertical position detecting line $Y_4$, the touch tracer controller 54 determines to be YES in Step 138 and shifts the process to Step 140 to determine that the vertical position detecting line $Y_4$ is the touch control position along the vertical direction.

When the infrared ray of the vertical position detecting line $Y_4$ is not intercepted (NO in Step 138), the process is shifted to Step 142 to read an output of the next vertical position detecting line $Y_3$ to confirm whether or not the infrared ray of the vertical position detecting line $Y_3$ is intercepted in Step 144.

When the finger making the touch control exists on the vertical position detecting line Y3 and the infrared ray of the vertical position detecting line Y3 is intercepted by the finger, the touch tracer controller 54 determined to be YES in Step 144 and shifts the process to Step 146 to determine that the vertical position detecting line $Y_3$ is the touch control position along the vertical direction.

When the infrared ray of the vertical position detecting line $Y_3$ is not also intercepted (NO in Step 144), the touch tracer controller 54 shifts the process to Step 148 to read an output of the next vertical position detecting line $Y_2$ to confirm whether or not the infrared ray of the vertical position detecting line $Y_2$ is intercepted in Step 150.

Thereby, the touch tracer controller 54 determines to be YES in Step 150 when the finger making the touch control is placed on the vertical position detecting line $Y_2$ and the infrared ray of the vertical position detecting line $Y_2$ is intercepted and shifts the process to Step 152 to determine that the vertical position detecting line $Y_2$ is the touch control position along the vertical direction. When the infrared ray of the vertical position detecting line $Y_2$ is not also intercepted, the touch tracer controller 54 determines to be NO in Step 150 and shifts the process to Step 154 to determine the bottom vertical position detecting line $Y_1$ is the touch control position.

Ending to determine the touch control position along the vertical direction as described above, the touch tracer controller 54 shifts the process to Step 156 to output the determined touch control position.

It allows power to be saved because it is not necessary to detect the touch control position always by all detecting lines by detecting whether or not the touch control has been made only in the vertical direction or the horizontal direction and by determining the touch control position in the other direction only when it is detected that the touch control has been made as described above.

Further, it is possible to judge the position of the tip of the finger precisely by reading orderly from the top in the vertical direction where the finger tip comes because control is made so that the finger tip comes to the desired position in making the touch control. Accordingly, it is possible to detect the area where the touch control is made and to display on the display 12 even when the operator makes the touch control by holding the remote controller 14 fitted with the input pad 70 by one hand.

It is also possible to arrange so as to determine the touch control position in the vertical direction by the vertical position detecting lines $Y_2$ through $Y_4$ by eliminating the vertical position detecting line $Y_1$ because the confirmation whether or not the infrared ray of the bottom vertical position detecting line $Y_1$ is intercepted may be eliminated. It allows the parts forming the vertical position detecting line Y1 to be eliminated and the cost to be reduced further.

Although the touch control has been detected by the horizontal position detecting lines $X_1$ through $X_3$ in the second embodiment, the touch control may be also detected by the vertical position detecting lines $Y_1$ through $Y_4$. The horizontal position detecting line $X_2$ may be eliminated similarly to $Y_1$.

It is noted that the embodiments described above do not limit the configuration of the invention. The invention may be applied to a touch control device having an arbitrary structure in which detecting lines using beams such as infrared rays are formed in the vertical and horizontal directions and the beams of the detecting lines are intercepted when a touch control is made.

As described above, the present invention brings about the excellent effect of allowing the precise judgment to be made corresponding to the intent of the operator by judging the touch control position based on non-detected lines whose beams are not intercepted among the vertical position detecting lines or the horizontal position detecting lines.

Further, the invention allows the touch control position to be judged at low resolution, so that the operator can make the control by blind touch and may feel no burden. Still more, the invention allows the number of the vertical position detecting lines or the horizontal position detecting lines to be reduced, so that the number of parts forming the detecting lines and the power consumption may be reduced.

What is claimed is:

1. A method for determining a touch control position on a control pad, comprising the steps of:
   (a) continuously providing a plurality of horizontal position detecting lines and a plurality of vertical position detecting lines across said control pad;
   (b) detecting at least one of said plurality of horizontal position detecting lines, which are formed in parallel in a vertical direction on the control pad by beams irradiated in the vertical direction from light emitting sections to light receiving sections, and at least one of said plurality of vertical position detecting lines, which are formed in a parallel in a horizontal direction of the control pad by beams irradiated in the horizontal direction from light emitting sections to light receiving sections;
   (c) detecting an interception of at least one of the plurality of horizontal position detecting lines or at least one of the plurality of vertical position detecting lines, and
   (d) determining a control position on said control pad on the basis of positions of said intercepted lines and at least one of said horizontal position detecting lines which is not intercepted and at least one of said vertical position detecting lines which is not intercepted.

2. A method of claim 1, wherein, in a case in which said control pad is divided into three areas in the horizontal direction:
   said Step (c) detects interception of at least one of horizontal position detection lines which are respectively formed in the vertical direction at both horizontal direction end portions of the control pad; and
   said Step (d) determines control to be at one of said three areas, on the basis of a position of at least one of said horizontal position detection lines which is not intercepted.

3. The method of claim 2, wherein, in a case in which all of the horizontal position detecting lines respectively formed at the both end portion are not intercepted, said Step (d) determines that the control position is a center area.

4. The method of claim 2, wherein in a case in which, of the horizontal position detection lines respectively formed at the both end portions, only one horizontal position detection line at one end portion is not intercepted, said Step (d) determines that the control position is an area portion at another end portion.

5. The method of claim 1, wherein, in a case in which said control pad is divided into three areas in the vertical direction:
   said Step (c) detects interception of at least one of vertical position detection lines which are respectively formed in the horizontal direction at both vertical direction end portions of the control pad; and
   said Step (d) determines control to be at one of said three areas, on the basis of a position of at least one of said vertical position detection lines which is not intercepted.

6. The method of claim 5, wherein, in a case in which all of the vertical position detecting lines respectively formed at the both end portions are not intercepted, said Step (d) determines that a center area is the control position.

7. The method of claim 5, wherein in a case in which, of the vertical position detection lines respectively formed at the both end portions, only one vertical position detection line at one end portion is not intercepted, said Step (d) determines that the control position is an area portion at another end portion.

8. The method of claim 1, wherein said Step (d) determines a horizontal control position on said control pad on the basis of a position of at least one horizontal position detecting line which is not intercepted, and then determines a vertical control position on said control pad based on the basis of a position of at least one vertical position detecting line which is not intercepted.

9. The method of claim 8, wherein, when detecting whether or not said vertical position detecting lines are intercepted, the vertical position detecting lines are detected in order from one endmost vertical position detecting line toward another endmost vertical position detecting line.

10. The method of claim 1, wherein said plurality of horizontal and vertical position detecting lines are provided by a plurality of light emitting sources.

11. A control pad, comprising:
    a plurality of horizontal position detecting lines formed in parallel in a vertical direction of said control pad by beams irradiated in the vertical direction from a plurality of light emitting sources to a plurality of light receiving detectors;
    a plurality of vertical position detecting lines formed in parallel in a horizontal direction of said control pad by beams irradiated in the horizontal direction from a plurality of light emitting sources to a plurality of light receiving detectors;
    a detector for detecting interception of at least one of the plurality of horizontal position detecting lines and at least one of the plurality of vertical position detecting lines; and
    a judging means for determining a control position on said control pad both on the basis of positions of horizontal and vertical position detecting lines intercepted, and on the basis of positions of at least one of said horizontal position detecting lines which is not intercepted and at least one of said vertical position detecting lines which is not intercepted.

12. The control pad according to claim 11, wherein,
    said control pad is divided into three areas in the horizontal direction,
    said horizontal position detection lines are respectively formed in the vertical direction at both horizontal direction end portions of the control pad, and
    in a case in which said detector detects interception of at least one of said horizontal position detection lines, said judging means determines the control position to be one of said three areas on the basis of a position of at least one of said horizontal position detection lines which is not intercepted.

13. The control pad according to claim 12, wherein, in a case in which all of the horizontal position detecting lines respectively formed at the both end portions are not intercepted, said judging means determines that the control position is a center area.

14. The control pad according to claim 12, wherein in a case in which, of the horizontal position detection lines respectively formed at the both end portions, only one horizontal position detection line at one end portion is not intercepted, said judging means determines that the control position is an area portion at another end portion.

15. The control pad according to claim 12, wherein,
    said control pad is divided into three areas in the vertical direction,
    said vertical position detection lines are respectively formed in the horizontal direction at both vertical direction end portions of the control pad, and in a case in which said detector detects interception of at least one of said vertical position detection lines, said judging means determines the control position to be one of said three areas on the basis of a position of at least one of said vertical position detection lines which is not intercepted.

16. The control pad according to claim 15, wherein in a case in which all of the vertical position detecting lines respectively formed at the both end portions are not intercepted, said judging means determines that a center area is the control position.

17. The control pad according to claim 15, wherein in a case in which, of the vertical position detection lines respectively formed at the both end portions, only one vertical position detection line at one end portion is not intercepted, said judging means determines that the control position is an area portion at another end portion.

18. The control pad according to claim 11, wherein said judging means determines a horizontal control position on said control pad on the basis of a position of at least one horizontal position detecting line which is not intercepted, and then determines a vertical control position on said control pad on the basis of a position of at least one vertical position detecting line which is not intercepted.

19. The control pad according to claim 18, wherein, when detecting whether or not said vertical position detecting lines are intercepted, said detector detects the vertical position detecting lines in order from one endmost vertical position detecting line another endmost vertical position detecting line.

20. The control pad according to claim 11, wherein said plurality of light emitting sources continuously emit said beams and said plurality of light receiving detectors continuously monitor a presence or absence of said beams.

* * * * *